Patented Aug. 3, 1937

2,089,078

UNITED STATES PATENT OFFICE 2,089,078

TAPER ATTACHMENT FOR LATHES

Frank Tyson, Canton, Ohio

Application May 20, 1936, Serial No. 80,722

6 Claims. (Cl. 82—12)

This invention relates to taper attachments for lathes such as may be provided for automatically machining tapered or coned surfaces on metal structures both exteriorly thereof and in bores therein.

The chief objects of the invention are to provide attachments of the character mentioned that may be easily and quickly mounted on and removed from the lathe; that are applicable to lathes of standard make without requiring material alteration of the latter; that have a wide range of angular adjustability so as to cut practically any taper desired; to provide against back lash or lost motion so that uniformity of cut is achieved; and to provide an apparatus of the character mentioned wherein power is applied to the cutting tool by mechanism disposed in the plane of movement of the tool, in all positions of angular adjustment thereof, to the end that torsional strain in the apparatus is obviated. Other objects will be manifest.

Of the accompanying drawings,

Figure 1 is a plan view of one embodiment of the invention and a fragmentary portion of a turret lathe upon which it is operatively mounted;

Figure 2 is a section, on a larger scale, taken on the line 2—2 of Figure 1;

Figure 3 is a section on the line 3—3 of Figure 2;

Figure 4 is a plan view of another embodiment of the invention, and a fragmentary portion of an engine lathe upon which it is operatively mounted;

Figure 5 is a section on a larger scale, taken on the line 5—5 of Figure 4; and

Figure 6 is a section, on a larger scale, taken on the line 6—6 of Figure 4.

Referring now to Figures 1 to 3 of the drawings, there is shown a turret lathe of standard construction comprising a bed 10 formed with longitudinal slideways 11, and an integral headstock 12 at one end of said bed. Extending from the headstock 12 over the slideways 11 is a driven spindle that carries a rotatable work-holding chuck 13, the latter being shown with a work-unit 14 mounted therein. At the opposite end of the lathe from the headstock 12, a turret slide 15 is mounted upon the slideways 11, said slide carrying the usual fixed center turret 16. A pilot wheel 17 is provided for manually adjusting the position of the slide 15 longitudinally of said slideways, and a feed shaft 18 automatically reciprocates the slide. Mounted upon the slideways 11, between the headstock 12 and the turret slide 15, is a cross-slide carriage 19 that is manually movable longitudinally of the slideways by means of the usual handwheel 20. Mounted upon the carriage 19 is a cross slide 21 that is manually movable transversely of the bed and slideways 11 by means of the usual feed screw (not shown) that is operated by the handwheel 22. Near one of its ends the cross slide 21 is formed with a square boss 23, and rising centrally therefrom is a fixed cylindrical post 24.

All of the foregoing equipment is of standard manufacture and need not be described in greater detail. The improved taper attachment constituting the subject matter of one embodiment of this invention is carried upon the cross slide 21.

As is most clearly shown in Figures 2 and 3, the taper attachment comprises a generally cylindrical cap-like fixture 26 that is suitably bored to fit over the post 24, and at one local region is formed with an axially extending slot 27, there being apertured ears 28 at each side of said slot for receiving bolts 29, 29 by means of which the fixture is clamped to the post 24 so as normally not to be movable relatively thereof, but to be capable of angular adjustment upon occasion. The fixture 26 is formed locally upon its bottom margin with a downwardly extending portion 30 that rests upon the boss 23 and provides additional support for a tool and tool operating mechanism presently to be described.

Projecting radially from the fixture 26, in the region of the supporting portion 30 and near the bottom of the fixture, is an integral bracket 32. A second integral bracket 33 is formed on the fixture 26 above bracket 33 and in spaced relation thereto. Extending through the free ends of brackets 32, 33 is a spindle 34 that is secured in lowermost bracket 32 by means of a set screw 35. The free ends of the brackets 32, 33 are rounded concentrically with the axis of spindle 34, the radius at the end of bracket 32 being considerably larger than the radius of bracket 33.

Supported upon bracket 32 is a slide-support 37 that is formed on one side, at the end thereof, with a laterally projecting ear 38 that fits nicely within the space between brackets 32, 33 and is swivelled on spindle 34. The bottom face of the slide support 37 is formed with a downwardly extending arcuate apron 39 that is concentric with spindle 34 and abuts the rounded free end of bracket 32, there being a cone-head set screw 40 threaded through said apron and adapted to engage in a slot 41 formed with tapered sides, which slot is formed in the arcuate end of said bracket. The arrangement permits angular adjustment of Aug. 3, 1937.  C. T. ULREY ET AL  2,089,079

SHOCK AND RAYPROOF X-RAY TUBE UNIT

Filed March 1, 1934  2 Sheets-Sheet 2

Patented Aug. 3, 1937

2,089,079

UNITED STATES PATENT OFFICE 2,089,079

SHOCK AND RAYPROOF X-RAY TUBE UNIT

Clayton T. Ulrey, East Orange, Louis F. Ehrke, Newark, and Maximilian F. Reges, East Orange, N. J., assignors, by mesne assignments, to Westinghouse Electric and Manufacturing Company, East Pittsburgh, Pa., a corporation of Pennsylvania Application March 1, 1934, Serial No. 713,462

6 Claims. (Cl. 250—34)

This invention relates to X-ray tubes of the type employed for either radiography or therapy and concerns itself more particularly to the combination with such tubes of housings therefor which effectively prevent the user thereof from being subject to electrical shock and stray X-ray emanation.

One of the forms of the so-called shockproof X-ray apparatus designed for radiography comprises a container which houses a transformer and an X-ray tube, both of which are immersed in oil. By reason of immersing the tube in oil it may be made of smaller dimensions than if the tube were surrounded by air, thus giving to such a structure a reasonable degree of compactness. However, such units weigh considerable because of the inclusion of a transformer therein and, therefore, require special supporting stands and furthermore are rather unwieldy to position.

In such apparatus no provision is made to house any tube other than that for which the unit was designed. For example, if the unit is designed for dental radiography, the X-ray tube is capable of only withstanding about sixty kilovolts. If designed for more general radiographic work the tube is designed for higher kilovoltages, however, the size of the apparatus is increased considerably inasmuch as the increased current demand of such tubes for special X-ray radiographs impose limitations upon the size of the transformers which can be used. It is thus obvious that separate units must be provided for each class of work for which it is to be utilized.

Still another form of shockproof radiographic X-ray device comprises a metallic or metal-coated insulating casing in which an X-ray tube is disposed and to which are connected high tension cables for supplying the necessary electrical energy for operating the X-ray tube. In this type of device the X-ray tube has a length equivalent to the length necessary for successful operation in air, which obviously makes such a structure rather cumbersome and unwieldy as well as expensive.

In both the foregoing devices the casing is connected to ground thus effectively rendering the same shockproof. In addition the casings are provided with material to absorb the stray X-ray emanations thus making them ray proof.

Therapeutic apparatus on the other hand usually comprises a large lead drum weighing thousands of pounds and housing an X-ray tube having a length commensurate with safe operation in air at voltages ranging from one hundred and fifty thousand to two hundred thousand or more. In some installations such drums are capable of a limited degree of movement. However, they are unsatisfactory in that they can not be positioned as readily as is desired in order to treat the diseased areas. Furthermore, they are not entirely shockproof as the high voltage conductors are so positioned as to enable one to contact the same, however, since they are made of lead they are ray-proof.

Recently, however, it has been proposed to make such therapeutic apparatus more flexible by immersing the X-ray tube in oil within a lead or other ray-proof casing and connecting the terminals of the X-ray tube to the high tension transformer by means of flexible cables covered with a grounded metallic sheath connected to the casing.

In such apparatus no effort has been made to make the unit compact and light in weight as X-ray tubes were used having a length corresponding to that which would enable safe operation of the tube in air.

The present invention overcomes the objections noted above with respect to the different shockproof apparatus now found on the market in that the container as designed for radiographic purposes is made in compact form and useful over the wide range of voltages and currents which have been found by long usage to be necessary in the making of radiographs of various parts of the anatomy.

In brief, the invention comprises a dumb-bell shaped casing having two outwardly extending tubular arms disposed one at each end of the casing. These arms are fitted with hollow insulating members hermetically secured to the outer ends of the arms and adapted to receive the flexible cables through which current and voltage is led to within the casing. The inner ends of these members serve as supports for the X-ray tube. This latter is of cylindrical form and is so disposed within the casing that the ends thereof which are at the highest voltage are located somewhat centrally of the enlarged portions of the casing while the smaller or central part of the casing is located along the mid section of the X-ray tube where the voltage is substantially zero.

By thus shaping the casing to conform with the electrical field about the X-ray tube it is possible to obtain a casing of minimum dimensions and in such manner obtain compactness and a tremendous decrease in the overall weight of the container and tube.

The casing is filled with an insulating and cooling material, such as oil or the like, which enables the distance between the electrode terminals of the tube and between the electrode terminals and the casing to be considerably reduced over that required in air at the same applied voltage thus resulting in a tube of greatly reduced overall length and a casing of minimum size and weight.

The tube is so supported on the tubular insulators as to permit ready removal thereof and the insertion of another X-ray tube as a replacement or one having a different electrical characteristic or rating, and to this end the casing is provided with a closure member at one end thereof which is removable.

Another feature of the present invention is the provision of a transparent window capable of transmitting light and which is also not appreciably absorptive to X-rays thus making it possible for the user to view the tube when in operation to ascertain whether or not the filament thereof is incandesced, and also for locating the center of the beam of X-rays emerging from the tube. The casing is also provided with shields of lead or other ray-absorptive material, at such places thereof where other than the useful beam of X-rays emerge.

A still further feature of the present invention is the provision of what might be termed a precision X-ray tube wherein the tube regardless of its particular characteristic relative to voltage and current may be readily positioned accurately in the container with the ray-projecting portion of the tube always in alignment with the transparent and ray pervious window.

Additional novel features of the present invention will become obvious to those skilled in the art by reference to the accompanying drawings wherein;

Figure 1 is an elevational view of an X-ray unit constructed in accordance with the present invention, Fig. 2 is an end view in elevation of the device shown in Fig. 1, Fig. 3 is a sectional view in elevation and on an enlarged scale taken on the line III—III of Fig. 2, Fig. 4 is a sectional view taken on the line IV—IV of Fig. 1, Fig. 5 is a sectional view taken on the line V—V of Fig. 3, Fig. 6 is a sectional view taken on the line VI—VI of Fig. 1 with a portion of the apparatus broken away, Fig. 7 is a sectional view taken on the line VII—VII of Fig. 3 and looking in the direction indicated by the arrows; and Fig. 8 is a schematic diagram showing the electrical field distribution surrounding the tube during operation.

Referring now to the drawings in detail a metallic casing of substantially dumb-bell configuration is shown in the several figures having substantially spherical ends 5 and 6 forming compartments which are joined together by means of a metallic cylindrical section or passage 7. A tubular metallic arm 8 extends radially from the spherical end 5 and similarly a tubular metallic arm 9 extends radially from the spherical end 6. A bushing 10 of insulating material extends inwardly of the tubular arm 8 and at one end thereof is provided with suitable fastening means, such as threads 11 adapted to threadedly engage the upper portion of the tubular arm 8 and form an oil tight connection therebetween. Suitable means, such as recesses 12, may be provided which are engageable by a tool or the like to enable the bushing 10 to be screwed in place within the tubular arm 8.

An annular collar 13 also threadedly engages the upper end of the tubular arm 8 and is of substantially the same diameter as that of the insulating bushing 10 to thus function as a locknut for maintaining this bushing in the desired longitudinal position as well as increase the effectiveness of the oil tight connection. If desirable oil resisting gaskets or cement may be interposed between the collar and bushing to still further enhance the effectiveness of the oil tight seal between the bushing and casing.

A metallic flange 14 is in turn secured to the annular collar 13 in a suitable manner, as by screws 15, and this flange thus establishes a firm metallic contact with the end of the tubular arm 8 and to effect further sealing to prevent oil discharge. This flange is also provided with an annular threaded portion, for a purpose to be hereinafter described, and is suitably grooved as shown more clearly in Fig. 7 to enable the insertion and removal of the screws 15.

The lower end of the insulating bushing 10 is likewise provided with a threaded portion 16 to which is secured a substantially spherical electrode 17 which may comprise a metallic shell secured to a block of insulating material 18, such as by screws 19, with the block 18 threadedly engaging the lower end of the insulating bushing 10 to form an oil tight closure member therefor and an electrode terminal disposed concentrically with the spherical compartment 5.

A pair of recessed metallic sleeves 20 and 21 (Fig. 5) are in the block 18 adjacent the end of the insulating sleeve 10. These sleeves are in turn electrically connected, by means of screws or connectors 22 and 23, to a similar pair of recessed metallic sleeves 24 and 25, one of which, 24, is of slightly reduced diameter, disposed in another side of the insulating block 18 co-axially with respect to the horizontal axis of the spherical ends 5 and 6 and the passage 7.

The sleeves 20, 21, 24 and 25 and the screws or connectors 22 and 23 may be welded or cemented in the insulation material for oil sealing and one of these sleeves 25 is connected by means, such as a screw 26 to the metallic electrode 17.

The tubular arm 9 is likewise provided with an insulating bushing 27, which is secured to the upper end of the tubular section in the same manner as previously described relative to the insulating bushing 10. An insulating member 28 forms a closure member for the lower end of the insulating bushing 27, which may frictionally engage the wall of the bushing or be suitably molded integral with or cemented thereto to form an oil tight seal, and is provided with a recessed metallic sleeve 29, similar to the sleeves 20 and 21, and which has a threaded stud portion extending through the lower surface of the insulating member. The metallic sleeve 29 and stud portion may be molded or cemented in the insulating member to form an oil tight seal.

A washer 30 of insulating material is screwed upon the exposed stud portion of the sleeve 29 to more securely maintain the member 28 in place and increase the oil tightness of the lower end of the insulating bushing 27. Again, if desired, a suitable oil resisting cement may be interposed therebetween to still further enhance the tightness of this connection.

A cylindrically shaped X-ray tube 31 is coaxially disposed relative to the horizontal axis of the compartments 5 and 6 and the passage 7, and is in spaced relation to all metallic parts of the casing with the ends of the tube being positioned at approximately the center of the compartments 5 and 6.

The cathode electrode 32 of the X-ray tube is provided with a pair of terminals 33 and 34, each of which are of a diameter corresponding to the recessed portions of the respective metallic sleeves 24 and 25, in order that they may slidably engage the latter for the purpose of supporting one end of the X-ray tube as well as permit the transmission of electrical energy thereto, and also for accurately locating the axial position of the tube with respect to the window in the casing. The X-ray tube is of a length between its terminals less than the air-gap equivalent, such construction being made possible because of the immersion of the tube in a fluid dielectric medium of higher dielectric strength than air.

The anode 35 of the X-ray tube is provided exteriorly of the envelope with an enlarged substantially spherical portion 36 of good heat conducting material for the purpose of dissipating heat from the anode during operation of the tube and which constitutes the anode terminal. A connecting member or strap 37 is connected, by means of a nut 38, to the exposed stud portion of the sleeve 29 and to the anode terminal 36 by set screws 39 for the purpose of supporting this end of the tube and conducting electrical energy to the anode, as well as allowing for slight expansion of the tube without placing undue strain upon the tube supporting structure.

The slidable engagement of the cathode terminals of the tube with the recessed sleeves 24 and 25, which because they are of different diameters, insure the tube's being coaxially positioned within the casing in only one position with the ray projecting portion thereof fixed. Moreover, this engagement of the cathode terminals of the tube with the spherical electrode terminal 17 rigidly carried by and forming a part of the insulating bushing 10 also fixes the longitudinal position of the tube with respect to the casing.

In order to energize the X-ray tube from a suitable source of high potential electrical energy (not shown) a pair of high tension cables 40 and 41 having a grounded metallic sheathing 42 extend therefrom and are connected to the metallic casing housing the X-ray tube. The respective cables 40 and 41 have the metallic sheathing 42 removed therefrom for a short distance of their length and insulating sleeves 43 and 44 surround the unsheathed portions thereof. These insulating sleeves are concentrically disposed relative to the respective insulating bushings 10 and 27 and extend longitudinally thereof a greater distance than the former and thus beyond the upper extremities of the metallic flanges 14 affixed to the casing.

A pair of contact terminals 45 and 46 are carried by the lower portion of the insulating sleeve 43, as shown in Fig. 5, and are connected to the conductors of the cable 40 which supplies the cathode heating current as well as one side of the high potential energy.

These terminals protrude beyond the exterior surface of the insulating sleeve 43 a short distance in order that they may slidably engage the recessed metallic bushings 20 and 21 carried by the insulating member 18 supporting the cathode end of the X-ray tube. In a similar manner the insulating sleeve 44 at the lower portion thereof, is provided with a terminal 47 extending slightly beyond the exterior surface thereof which is connected to the conductor of the high tension cable 41 and slidably engages the recessed metallic sleeve 29 to thus transmit electric energy directly to the anode of the X-ray tube through the supporting strap 37. The grounded metallic sheathed cables 40 and 41 are both connected to the metallic casing in the identical manner so a detailed description of one should suffice.

Each of the insulating sleeves 43 and 44 is provided with a reduced diameter portion adjacent the metallic flange 14 and an annular ring 48 surrounds these sleeves and bears on the shoulder formed by the increased diameter portion of the sleeves. An internally threaded annular collar 49 surrounds the reduced diameter portion of the respective insulating sleeves 43 and 44 and engages the aforementioned threaded portion of the flange 14 affixed to the casing, to thus cause the ring 48 to bear firmly against the shoulders formed in the respective insulating sleeves. This accordingly retains the sleeves firmly within the insulating bushings 10 and 27 with the terminals carried by the respective insulating sleeves engaging the recessed metallic sleeves 20, 21 and 29 to transmit energy from the source to the X-ray tube.

For the purpose of completing a metallic connection from the metallic casing to the grounded metal sheathing of the cables 40 and 41, as well as to make this connection slightly flexible to prevent fraying of the metallic sheathing, a metallic sleeve 50 is provided which slidably, though firmly, engages the upper ends of the insulating sleeves 43 and 44 and establishes a good metallic contact with the annular threaded metal collar 49 by flaring slightly outwardly. At the other end thereof these metallic sleeves 50 are maintained in firm contact with the sheathed portion of the respective cables 40 and 41 by means of a metallic spring 51 which serves to not only maintain the sleeve 50 in contact with the sheathed portion of the cables, but also to allow some flexibility thereof.

In order to reduce the insulation requirements between all high tension carrying parts and ground, as well as utilize an X-ray tube, as hereinbefore noted, of foreshortened length, it is preferable to ground the midpoint of the high tension transformer normally employed as the source of high tension energy for the X-ray tube and to immerse the tube in a cooling and insulating material of higher dielectric strength than air, such for example as oil 52, which completely fills the casing as shown in Fig. 3 thus not only surrounding the X-ray tube 31, but also augmenting the insulation of the respective bushings 10 and 27. This cooling and insulating fluid 52 is of such quality as to not only be non-inflammable but in addition is so free of impurities as to not carbonize to form a residue within the casing or around the highly heated portions of the tube which residue might form a heat insulator.

The invention herein concerns itself with the combination of an X-ray tube and casing of minimum size and weight which is accomplished by shaping the casing to conform to the electrical field and the dielectric strength of the insulating fluid surrounding the tube electrodes. Since the midpoint of the transformer secondary is grounded, it follows that one half of the total potential applied to the tube is applied to each electrode terminal and the insulating fluid in the space between each of these terminals and the casing must stand half the total applied potential. Also since the potential at the midpoint of the tube is substantially at zero or ground potential, the spacing between the tube and casing at this point may be a minimum.

It is known that the spacing between electrodes or surfaces in a dielectric fluid, such as air, when impressed with a potential of opposite polarity require a definite spacing therebetween depending upon the maximum potential applied to prevent spark-over therebetween. This is primarily due to the intensity of the electric field or potential gradient being at a maximum at the surfaces which causes ionization with accompanying break-down of the dielectric and attendant spark-over between the surfaces. However, this maximum field intensity or potential gradient may be reduced to a minimum by giving the electrodes or surfaces such a geometrical configuration that they have a substantial radii of curvature together with an absence of sharp points and edges. Moreover, when the electrode terminals consist of parallel planes the potential gradient varies inversely as the distance between the electrodes, but by giving these electrodes a configuration, as above noted, the potential gradient becomes a minimum for a definite separation thereof and this variation of the potential gradient no longer holds thus enabling a shorter spacing between the electrodes for the same applied potential and with the same dielectric fluid.

The foregoing particularly holds true in the case of concentrically disposed electrodes or surfaces, with only a slight mathematical variation in instances of concentric spheres from that of concentric cylinders, which to all intents and purposes insofar as the present invention is concerned, may be regarded as immaterial.

This phenomenon of the field intensity or potential gradient with spherical electrodes being reduced to a minimum by the shaping of the electrodes in air likewise holds in dielectric fluids having a higher dielectric strength such, for example, as oil. By employing oil as a dielectric fluid not only can the spacing of electrodes and surfaces having plane surfaces and sharp points or edges be materially reduced for the same applied voltage when operating in air, but by utilizing electrode surfaces having such a configuration as to reduce the potential gradient, as before noted, the spacing of the electrodes and surfaces can be still further reduced in a dielectric such as oil.

Accordingly in the present invention advantage is taken of not only both these phenomena, but in addition the casing is given a shape to conform to the field intensity or potential gradient on the tube as well as the potential distribution around the tube to produce a shockproof unit of absolute minimum size and compactness. In Fig. 8 the grounded casing constituting and equipotential surface is shown by the dotted outline surrounding the X-ray tube 31, with the radius of the spherical compartment portions 5 and 6 or spacing of the casing being greatest in the vicinity of the electrode terminals 17 and 36 both of which are substantially spherical with an absence of points and edges to reduce the potential gradient thereon to a minimum. Inasmuch as the potential drop between the respective electrode terminals and the mid-portion of the tube, as well as between the terminals and casing, is from one-half the total applied potential to zero, there is a varying potential distribution around the tube from zero at the mid-portion thereof to maximum in the vicinity of the electrodes, with this maximum requisite spacing being determinable by the maximum applied potential and the dielectric strength of the fluid utilized.

Moreover, although the potential gradient at the respective electrodes, as indicated by the lines A in Fig. 8, is reduced to a minimum by the provision of substantially spherical electrode terminals concentrically disposed relative to the surrounding casing, this field intensity is naturally greater at the terminals than at any point on the envelope of the tube. This is due to the potential distribution about the tube as well as to the fact that at any given point on the electrodes interiorly of the envelope the potential gradient may be even higher than at the electrode terminals, but because of the vacuum and glass wall of the tube the potential gradient on the exterior of the envelope adjacent any point of the electrodes, such as shown at the lines B of Fig. 8, is less than at the electrode terminals. This enables a spacing of the casing from the tube wherein the potential gradient or field intensity through the dielectric between any point on the wall of the envelope and the casing is at least no greater than through the dielectric between the respective electrode terminals and the casing.

The casing having a configuration conforming to the potential distribution around the tube and the resultant potential gradient and being filled with a dielectric fluid having a high dielectric strength, such as oil, enables the spacing between the tube and casing to be reduced to a minimum with the volume of the oil also varying in conformity to the potential distribution from substantially zero at the center of the tube to maximum about the electrode terminals.

While the casing may actually contact the tube at the center or zero portion it is preferable to provide a small spacing at this point to allow for the expansion of the envelope of the tube, without the same actually contacting the casing, as well as to allow a small volume of the dielectric fluid to surround the tube for cooling and to absorb undue shocks thereto.

The X-ray tube during operation generates appreciable heat which is dissipated, as before stated, by the anode terminal 36 to the surrounding cooling and insulating fluid and in order to compensate for the expansion thereof the compartments or ends 5 and 6 of the casing are provided respectively with suitable expansion bellows 53 and 54 which are secured thereto in an oil tight manner. Moreover, to facilitate the removal of the X-ray tube and the replacement of other tubes of different current and voltage characteristics in accordance with the desired radiographic examination the entire unit need only be turned on end to prevent displacement of the cooling and insulating material and the expansion bellows 54 adjacent the anode end of the tube removed. This enables ready access to the screws 39 which are removed to disconnect the supporting strap 37 from the anode terminal enabling withdrawal of the tube from the casing with slidable disconnection of the cathode terminals.

In the replacement of a new tube the services of a skilled technician are not required and it may be readily accomplished at the place of installation. Inasmuch as the cathode terminals are of different diameter the tube can be inserted in only one way thus fixing the axial position thereof, and being rigidly supported at the cathode end by the insulating bushing 10, which also acts as a stop, it is also simultaneously adjusted to the correct longitudinal position relative to the casing prior to connection and supporting of the anode terminal.

Moreover, the manner of supporting the tube within the casing in a cooling and insulating fluid results in substantially a suspension of the tube without strain on the supports thus greatly facilitating shipment of the entire unit as the dielectric fluid will absorb shocks in handling eliminating deleterious effects to the tube.

In order to confine the generated X-rays to a field of the desired area an X-ray pervious and light transparent window, shown generally at 55, is provided in the tubular portion 7 of the casing adjacent the ray projecting portion of the X-ray tube and is secured thereto in any suitable manner. A threaded collar 56 may be welded or otherwise secured to the metallic portion 7 of the casing which projects slightly outward and a member in the form of a thimble 57 may rest against the outer rim of the collar 56 and extend interiorly thereof and of the casing, to reduce the volume of dielectric fluid between the tube and window to a minimum to prevent distortion of the X-rays. In order to make this window transparent to visible light so that an operator may readily ascertain when the thermionic cathode of the totally enclosed X-ray tube is incandesced, as well as to reduce the absorption of the generated X-rays to a minimum, it has been found that material, commercially known as "glyptal", possesses these characteristics although any other material having the desired requisites will also suffice.

A threaded ring 58 engages the threaded portion of the collar 56 and retains the member 57 firmly in position within the casing and in contact with the rim of the collar 56. Should it be desired the ring 58 may be provided with a still further material 59, pervious to X-rays with a minimum of absorption and transparent to visible light, for the purpose of forming a protective cover for the glyptal window 57.

A layer of ray opaque material, such for example as lead 60, surrounds the tubular portion 7 of the casing and fits around the collar 56 to prevent the emanation of X-rays except through the pervious and transparent window 55.

Although the invention as described specifically herein pertains to radiographic shock and ray proof apparatus of minimum size and weight, it is obvious that the same is equally applicable to therapy X-ray tubes and apparatus.

Having thus described one embodiment of our invention we do not desire to be limited thereto as various other modifications thereof may be made without departing from the spirit and scope of the appended claims.

What is claimed:

1. The combination with an X-ray tube having electrode terminals of substantial radii of curvature, and spaced apart a distance less than that required to prevent spark-over therebetween at maximum operating voltage of the tube, of a grounded metallic casing surrounding said X-ray tube with all portions thereof in the vicinity of said electrode terminals being spherically disposed relative thereto whereby the spacing between said electrode terminals and the surrounding casing is reduced to less than that normally required to prevent spark-over therebetween, and the entire casing being spaced from all parts of said tube a distance varying in accordance with the variations of the potential gradient between said casing and all points on the wall of said tube, and said spacing at all points along the wall of said tube being normally insufficient to prevent the potential gradient from causing spark-over therebetween at the maximum operating voltage of said tube, and a dielectric fluid of a higher dielectric strength than air in said casing and immersing said X-ray tube for the purpose of cooling and insulating said X-ray tube, and the cross sectional area of said dielectric at any point between said tube and casing being at least no greater than that absolutely necessary to prevent spark-over therebetween at the maximum operating voltage of said tube to reduce the combined weight of said casing and dielectric fluid.

2. The combination with an X-ray tube provided with an envelope and electrode terminals spaced apart a distance less than that required to prevent spark-over therebetween for a tube operating in air at the same applied voltage, of a casing surrounding said tube and containing a fluid dielectric having a higher dielectric strength than air for cooling and insulating said X-ray tube, said casing being so shaped that the potential gradient at any point on the envelope of said tube between the latter and said casing is less than between said electrode terminals and said casing thereby reducing the size of the casing, and the cross-sectional area of said fluid dielectric at all points between said casing and said tube being at least no greater than that necessary to prevent spark-over therebetween at the maximum operating voltage of said tube to reduce the combined weight of the casing and fluid dielectric.

3. The combination with an X-ray tube provided with an envelope and electrode terminals spaced apart a distance less than that required to prevent spark-over therebetween for a tube operating in air at the same applied voltage, of a casing containing a fluid dielectric having a higher dielectric strength than air, said casing being spaced at all points from said X-ray tube a distance at least no greater than that necessary to prevent spark-over therebetween at the maximum operating voltage of said tube and forming a configuration corresponding to the potential distribution around said tube during operation to reduce the size of said casing to a minimum, and said fluid dielectric surrounding said X-ray tube varying in cross-sectional area in order to cause the potential gradient at any point between the envelope of said tube and said casing to be less than between said electrode terminals and said casing whereby the size and weight of the casing and dielectric is reduced to a minimum.

4. A shockproof X-ray apparatus comprising a grounded metallic casing, tubular arms extending outwardly therefrom, insulating bushings concentrically disposed relative to said tubular arms and connected by an oil tight connection to the outer ends of said arms, an X-ray tube having electrode terminals spaced apart a distance less than that required for a tube operating in air at the same applied voltage and supported by said arms with its cathode terminal slidably engaging one of said insulating bushings and its anode end removably secured to the other of said insulating bushings, said casing being spaced at all points a minimum distance from said tube to prevent spark-over therebetween and to reduce the size of said casing to an absolute minimum, a cooling and insulating fluid immersing said X-ray tube and surrounding said insulating bushings with the volume thereof disposed between said tube and casing varying from minimum at the points of least potential gradient to maximum at the points of greatest potential gradient for the purpose of reducing the weight of said apparatus, and means detachably secured to said casing to compensate for expansion of said cooling and insulating fluid and to enable the disconnection of said X-ray tube from its support and the withdrawal thereof from said casing.

5. A shockproof X-ray apparatus comprising a grounded metallic casing, an X-ray tube within said casing having electrode terminals spaced apart a distance less than that required for a tube operating in air at the same applied voltage, means in said casing for coaxially supporting said X-ray tube in spaced relation relative to said casing, said casing being spaced at all points a minimum distance from said tube to prevent spark-over therebetween and to reduce the size of said casing to a minimum, a cooling and insulating fluid disposed between said X-ray tube and said casing with the volume thereof varying from minimum at the point of least potential gradient to maximum at the points of greatest potential gradient for the purpose of reducing the weight of said apparatus, a removable cover at one end of said casing to enable the insertion and removal of said X-ray tube from said casing, and a window carried by said casing adjacent the ray projecting portion of said X-ray tube pervious to X-rays and transparent to visible light in order to give a visual indication when the thermionic cathode of the totally enclosed X-ray tube is incandesced.

6. A shockproof X-ray apparatus comprising a metallic casing formed of two substantially spherical compartments joined by a cylindrical passage, a tubular arm extending outwardly from each of the spherical compartment portions of said casing, insulating bushings forming an oil tight connection with the upper ends of each of said tubular arms and extending inwardly thereof with their ends terminating at substantially the center of the spherical compartment portions of said casing, an X-ray tube disposed coaxially with respect to the cylindrical passage portion of said casing and supported by its electrode terminals detachably engaging the ends of said insulating bushings, a cooling and insulating fluid immersing said X-ray tube and surrounding said insulating bushings, said fluid augmenting the insulating characteristics of said bushings and the volume of said dielectric fluid varying in accordance with the potential gradient imposed upon said X-ray tube during operation, a detachable bellows carried by said casing to compensate for the expansion of said cooling and insulating fluid and to enable insertion and removal of said tube from said container, and a reentrant window in said casing pervious to X-rays and transparent to visible light to restrict the radiation of X-rays to a field of the desired area and to enable an operator to obtain a visual indication when the thermionic cathode of said X-ray tube is incandesced.

CLAYTON T. ULREY.
LOUIS F. EHRKE.
MAXIMILIAN F. REGES.